July 9, 1929.  J. S. REID  1,720,350
RETAINING MEANS FOR REMOVABLE CLOSURES
Filed Oct. 10, 1927
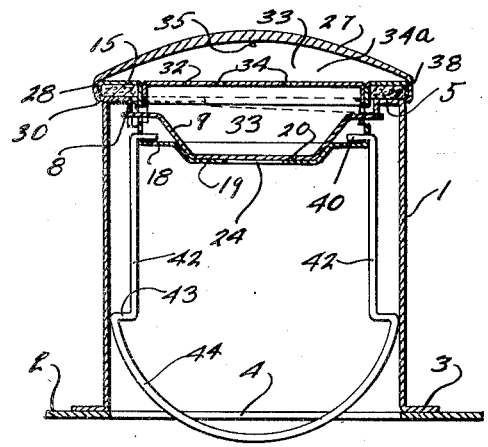
FIG.-1
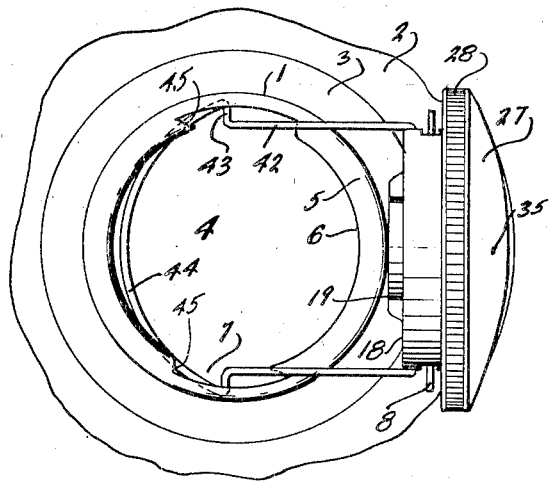
FIG.-2
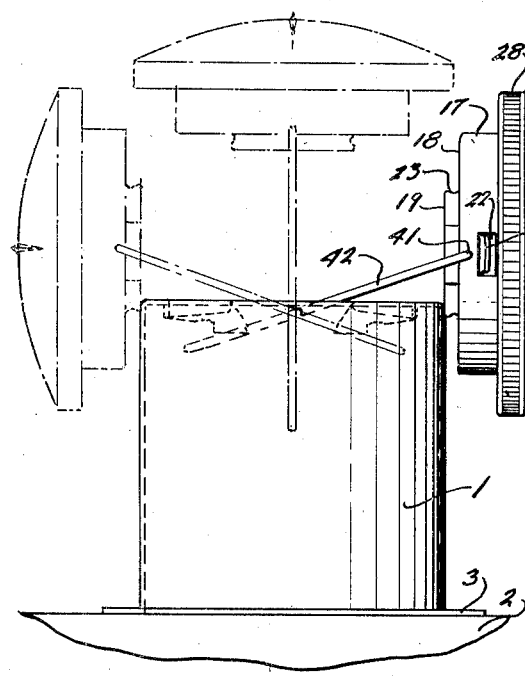
FIG.-3
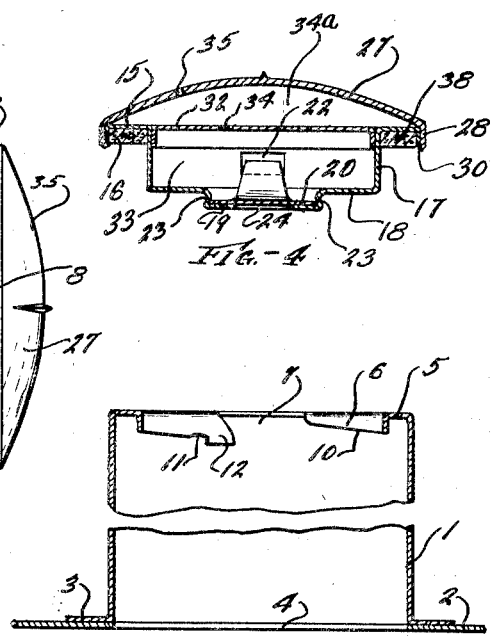
FIG.-4
FIG.-5
Inventor
James S. Reid
By Brockett & Hyde
Attorneys Patented July 9, 1929.

1,720,350

UNITED STATES PATENT OFFICE.

JAMES S. REID, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

RETAINING MEANS FOR REMOVABLE CLOSURES.

Application filed October 10, 1927. Serial No. 225,351.

This invention relates to improvements in means for maintaining a removable closure in associated relation with the device to be closed, and has particular reference to closures of the bayonet-joint type adapted for use with automobile radiators and automobile fuel tanks.

The general objects of the present invention are to provide simple and improved means for maintaining a closure of the bayonet-joint type in associated relation with the filler neck of an automobile radiator or fuel tank, so that there is no liability of said closure becoming accidentally dissociated from said neck and being lost; to provide closure maintaining means which enables the closure to be readily moved to the side of the filler neck where it will not interfere with a filling nozzle inserted into the neck; and finally, to provide closure maintaining means which guides the closure to such position on the filler neck that connection therewith can be most easily and quickly effected.

Further objects of the invention are in part obvious and in part will appear more in detail hereinafter.

In the drawings, Fig. 1 is a vertical sectional view of a bayonet-joint closure applied to a tubular filler neck, with my improved means connected to said closure for maintaining the same in associated relation with said neck; Fig. 2 is a top plan view thereof, with the closure removed from the neck and swung to one side; Fig. 3 is a side elevation of these parts in the position in which they appear in Fig. 2; Fig. 4 is a vertical sectional view of the closure; and Fig. 5 is a vertical sectional view of the filler neck.

For the purposes of illustrating the present invention, I have shown in the drawings a closure and a filler neck of substantially the same construction shown in my co-pending application for closures, filed October 10, 1927, Serial No. 225,352, although it is to be understood that my improved maintaining means is not limited in its use to closures and filler necks of only this form.

Said filler neck comprises a tubular body portion 1 which may be an integral part of an automobile radiator or fuel tank 2 or may be separate therefrom and provided with a base flange 3 for suitable connection to the radiator or tank 2 around the filling opening 4 thereof. Said tubular body portion is provided at its upper end with an inwardly extending, substantially horizontal flange 5 which terminates in a depending flange 6. At two diametrically opposite points, portions of flanges 5 and 6 are cut away so as to provide two openings or passageways 7 through which the end portions 8 of the locking spring fingers 9 of the closure are adapted to be passed, as will later appear. The cutting away of said flanges provides two depending flange portions 6, each of substantially semi-circular form, and the bottom edges of these flange portions are inclined to provide cam portions 10 with which the end portions 8 of the closure locking fingers are adapted to co-operate in effecting detachable locking connection of the closure with the filler neck. Recessed dwell portions 11 are provided in the rear ends of these cam portions to receive the finger end portions 8 when the closure is in proper locked position on the filler neck. Just beyond said dwell portions, the flanges 6 are provided with depending lugs or projections 12 which form stops for the closure locking fingers as they travel up the cam portions 10, and insure the seating of said fingers in the dwell portions 11.

The closure here illustrated includes a one-piece body member comprising a central cup-shaped portion 17, 18, a horizontal flange portion 15 of annular form extending outwardly from the top of said cup-shaped portion, and a cylindrical flange or skirt portion 16 depending from the outer edge of said horizontal flange portion. Said cup-shaped portion includes a cylindrical side wall 17 and a circular bottom wall 18 provided with a centrally disposed, depending dome 19 forming a recess to receive the substantially circular base or body portion 20 of a locking member. Extending upwardly and outwardly from the base or body portion of said locking member are two opposed locking spring fingers 9, before referred to, which terminate in directly outwardly extending cam engaging end portions 8 which project outwardly through opposed openings 22 in the cylindrical side wall 17 of the closure body member. While the base or body portion of said locking member may be secured within the recess of dome 19 by any suitable means, it is preferably crimped therein, and in the present illustration, two opposed side edge portions of said dome are crimped about the corresponding side edge portions of said base or body portion, as indicated at 23, Fig. 4. Preferably, and as shown, a circular opening 24 is provided at the center of the dome 19 for facilitating the manufacture of this part of the closure, as will be readily understood.

The closure body member is covered by a suitable top member which includes a circular dome portion 27 and a cylindrical depending skirt portion 28. Said dome portion overlies the cup-shaped portion 17, 18 and the top flange portion 15 of the closure body member and the skirt portion 28 of said top member snugly surrounds the depending skirt portion 16 of the closure body member. Said top member is locked or secured to said body member by bending inwardly beneath the skirt portion 16 of the latter the lower edge of the skirt portion 28 of the former, as indicated at 30, Fig. 4. If desired, and as shown, an inverted cup-shaped member 32 may be positioned in the cup-shaped portion 17, 18 of the closure body member at substantially the top thereof, which member 32 not only insures a stronger closure but also provides a baffle for the openings 22 which constitute the means for establishing communication between the air chamber 33 in the cup-shaped portion 17, 18 of the closure body member and the inside of the tubular filler neck and hence the radiator or tank 2. The member 32 is provided in its top wall with one or more openings 34 which provide communication between the closure air chamber 33 and an upper closure air chamber 34$^a$, between member 32 and the dome portion 27 of the closure top member, air chamber 34$^a$ being vented to the outside atmosphere through one or more openings 35 in said dome portion.

The closure is applied to the filler neck in the usual manner of bayonet-joint connections, the locking spring fingers of the closure being passed down through the passageways 7 of the filler neck. The closure is then turned in a clockwise direction which causes the locking fingers thereof to ride up the cam portions 10 with yielding effect, the rotary movement being continued until said fingers strike the stop portions 12, at which point they seat in the dwell portions 11. To remove the closure, it is only necessary to turn it in the reverse direction, whereupon the spring fingers will leave the dwell portions 11 and will ride down the cam portions 10, finally reaching the passageways 7. The closure can then be removed from the filler neck, the locking fingers being passed upwardly through said passageways, as before.

Preferably, the closure is provided with a yielding gasket 38 which is adapted to lie between the top horizontal flange portion 5 of the filler neck and the top flange 15 of the closure body member when the closure is applied to the filler neck, as in Fig. 1. The gasket is of slightly greater width than the annular chamber of the body member formed by the cylindrical side wall 17 and the depending skirt portion 16 thereof, and the gasket is therefore frictionally maintained in said chamber, even when the closure is removed from the filler neck. If the gasket should leave said chamber, it would be prevented from becoming separated from the closure by the outwardly extending end portions 8 of the closure spring fingers.

Coming now to the means for maintaining the closure in associated relation with the filler neck, said means comprises a one-piece substantially U-shaped resilient member, which is here shown as a piece of resilient wire of the desired strength and rigidity. The two free ends of said member are pivotally connected or anchored to the closure, preferably by a detachable connection, so that the closure and the maintaining member may be readily connected and disconnected, whenever desired.

In the specific embodiment of the invention here illustrated, the two upper ends of the maintaining member are bent inwardly, as at 40, and are adapted to lie within opposed openings 41 in the cylindrical side wall 17 of the closure body member, said openings being preferably below and in alignment with the side wall openings 22 through which extend the closure locking fingers 9.

Depending from these anchoring end portions 40 of the maintaining member are two arm portions 42 thereof, each of which is provided at its lower end with an outwardly extending, substantially horizontal portion 43. The outer ends of these portions 43 are connected by a depending, substantially semi-circular portion 44 which gives the maintaining member a lower end portion of substantially tapering form, as will be readily apparent from Fig. 1.

When the maintaining member is positioned within the filler neck, as in Figs. 1, 2 and 3, the outwardly and diametrically oppositely extending portions 43 of said member yieldingly engage the inner cylindrical surface of the body portion 1 of the filler neck, and by engaging the two cam portions 10 thereof and the lower surface of the horizontal flange portions 5 adjacent the two neck passageways 7, limit the upward movement of the maintaining member relative to the filler neck. The maintaining member, and the closure mounted upon the upper ends thereof, are therefore effectively prevented from accidentally becoming detached or dissociated from the filler neck, so that there is no liability of the closure being lost when it is disconnected or removed from the filler neck. By having the portions 43 of the maintaining member yieldingly engage opposed portions of the inner surface of the filler neck, there is no liability of the lower portion of the maintaining member moving laterally within said neck, with consequent noise, but such yielding engagement does not prevent the closure from being easily and readily turned relative to the filler neck.

The pivotal mounting of the closure upon the upper ends of the maintaining member enables the closure to be readily swung to a vertical position at the side of the filler neck, as indicated in Figs. 2 and 3, where it will not interfere with a nozzle inserted into the filler neck for filling the radiator or tank 2. The maintaining member as a whole is swung to one side at such time with the lower semi-circular end portion 44 thereof lying at one side of the filler neck opening adjacent one of the semi-circular depending flanges 6 thereof.

By securing the maintaining member to the closure below and in alignment with the locking fingers thereof, said closure will be guided by said maintaining member to such position on the filler neck that connection therewith can be most easily and quickly effected. In other words, when the closure is removed from the filler neck, the closure locking fingers and the arm portions 42 of the maintaining member pass upwardly through the passageways 7 of the filler neck, and said arm portions remain in said passageways during the period of removal of the closure, appreciable rotary movement of the maintaining member being prevented by the inwardly extending edge portions 45 at the side of the passageways 7 in the top flange 5 of the filler neck. Therefore, when it is again desired to apply the closure to the filler neck, the closure locking fingers will follow the arm portions 42 of the maintaining member down through the passageways 7 and said fingers are therefore guided to the starting points 45ª of the cam portions 10, so that connection of the closure with the filler neck can be easily and quickly effected.

The semi-circular bottom portion 44 of the maintaining member enables the outwardly extending portions 43 thereof to be readily passed downwardly through the passageways 7 of the filler neck and to be positioned below the top flange 5 thereof, it being only necessary to engage said semi-circular bottom portion with the flange portions 5 adjacent the passageways 7 and then apply downward movement to the maintaining member, as said member possesses sufficient resiliency to permit portions 43 to move inwardly the desired amount. To remove the maintaining member from the filler neck, the arm portions 42 of said member are pressed inwardly or toward each other, which will produce corresponding inward movement of portions 43 of said member, as will be readily understood.

What I claim is:

1. In combination, a device provided with an opening, a removable closure for said opening, and means for maintaining said closure in associated relation with said device, said means including two spaced depending arms upon the upper ends of which the closure is pivotally mounted, the lower end portions of said arms being positioned within said device and being provided with means for preventing accidental escape thereof from said device through the opening thereof.

2. In combination, a device provided with an opening, a removable closure for said opening, and means for maintaining said closure in associated relation with said device, said means including two spaced depending resilient arms connected to each other and upon the upper ends of which the closure is pivotally mounted, the lower end portions of said arms being positioned within said device and being provided with means for preventing accidental escape thereof from said device through the opening thereof.

3. In combination, a device provided with an opening, a removable closure for said opening, and means for maintaining said closure in associated relation with said device, said means including two spaced depending arms having upper end portions upon which the closure is mounted and lower end portions positioned within said device and which extend outwardly a sufficient amount to prevent accidental escape thereof from said device through the opening thereof, said lower end portions being connected to each other.

4. In combination, a device provided with an opening, a removable closure for said opening, and means for maintaining said closure in associated relation with said device, said means including two spaced depending arms having upper end portions upon which the closure is mounted and lower end portions positioned within said device and which extend outwardly a sufficient amount to prevent accidental escape thereof from said device through the opening thereof, said lower end portions being connected to each other by a curved depending portion.

5. In combination, a device provided with an opening, a removable closure for said opening, and means for maintaining said closure in associated relation with said device, said means including two spaced depending arms having upper end portions upon which the closure is mounted and lower end portions positioned within said device and which extend outwardly a sufficient amount to prevent accidental escape thereof from said device through the opening thereof, said lower end portions being connected to each other by a curved depending portion integral therewith.

6. In combination, a device provided with an opening having two opposed lateral extensions, a removable closure for said opening having two opposed locking fingers adapted to be passed through said extensions in applying the closure to said device, and means for limiting movement of said closure from said device, said means including two depending arms having upper end portions connected to said closure below the locking fingers thereof and lower end portions provided with means for confining the same within said device, the parts being so arranged that said arms lie within the extensions of said opening when the closure is moved from said device and therefore guide the locking fingers of the closure to said extensions when the closure is again moved into engagement with said device.

In testimony whereof I hereby affix my signature.

JAMES S. REID.